(12) United States Patent
Xu et al.

(10) Patent No.: US 9,178,561 B2
(45) Date of Patent: Nov. 3, 2015

(54) METHOD AND APPARATUS FOR CORRELATING SIGNALS RECEIVED FROM A NAVIGATION SATELLITE SYSTEM

(71) Applicant: Marvell World Trade Ltd., St. Michael (BB)

(72) Inventors: Feng Xu, Milpitas, CA (US); Zhike Jia, Fremont, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/483,112

(22) Filed: Sep. 10, 2014

(65) Prior Publication Data
US 2015/0071332 A1    Mar. 12, 2015

Related U.S. Application Data

(60) Provisional application No. 61/876,368, filed on Sep. 11, 2013.

(51) Int. Cl.
*H04B 1/707* (2011.01)
*H04B 1/709* (2011.01)

(52) U.S. Cl.
CPC .................... *H04B 1/709* (2013.01)

(58) Field of Classification Search
CPC .................... H04B 1/707–1/7095
USPC .................... 375/150
See application file for complete search history.

(56) References Cited

U.S. PATENT DOCUMENTS

| | | | |
|---|---|---|---|
| 5,949,815 | A | 9/1999 | Pon |
| 6,252,546 | B1 | 6/2001 | Lennen et al. |
| 6,330,273 | B1 | 12/2001 | Hulbert et al. |
| 6,463,091 | B1 | 10/2002 | Zhodzicshsky et al. |
| 6,496,141 | B2 | 12/2002 | Pippin |
| 6,636,558 | B1 | 10/2003 | Schnaufer et al. |
| 6,744,404 | B1 | 6/2004 | Whitehead et al. |
| 6,760,364 | B2 | 7/2004 | Kohli et al. |
| 6,868,110 | B2 | 3/2005 | Phelts et al. |
| 7,301,992 | B2 | 11/2007 | Kohli et al. |
| 7,639,181 | B2 | 12/2009 | Wang et al. |
| 7,839,916 | B1 | 11/2010 | Luecke et al. |
| 7,876,807 | B2 | 1/2011 | Ray et al. |
| 2002/0077125 | A1 | 6/2002 | Hunzinger |
| 2002/0101912 | A1 | 8/2002 | Phelts et al. |
| 2005/0124368 | A1 | 6/2005 | Diao et al. |
| 2006/0072653 | A1* | 4/2006 | Hafuka ................ 375/148 |

(Continued)

OTHER PUBLICATIONS

Ward, et al., "Satellite Signal Acquisition, Tracking, and Data Demodulation," in *Understanding GPS Principles and Applications*, 2nd Ed., pp. 153-241 (Kaplan et al. eds., Artech House 2006).

*Primary Examiner* — Don N Vo (57) ABSTRACT

A plurality of samples of a signal are stored in a buffer, the signal corresponding to a navigation system. A plurality of starting locations in the buffer are determined, the plurality of starting locations corresponding to a plurality of correlations to be calculated. A plurality of correlations are calculated using i) a plurality of local replica signals, and ii) data read from the buffer using the plurality of starting locations, the local replica signals corresponding to pseudo random number (PRN) codes utilized by transmitting devices in the navigation system. The plurality of correlations are utilized to one or more of i) detect PRN codes in the signal, ii) detect one or more phase shifts associated with PRN codes, or iii) detect one or more frequency shifts associated with PRN codes.

21 Claims, 5 Drawing Sheets

(56) References Cited

U.S. PATENT DOCUMENTS

| | | |
|---|---|---|
| 2006/0077300 A1* | 4/2006 | Cheon et al. .................. 348/614 |
| 2006/0133461 A1 | 6/2006 | Sleewaegen |
| 2007/0098055 A1 | 5/2007 | Raman et al. |
| 2009/0110134 A1 | 4/2009 | Yuan et al. |
| 2009/0115656 A1 | 5/2009 | Raman et al. |
| 2009/0147833 A1 | 6/2009 | Pietila et al. |
| 2009/0195449 A1 | 8/2009 | Bedell et al. |
| 2012/0026994 A1* | 2/2012 | Agarwal et al. ............... 370/338 |
| 2014/0023122 A1* | 1/2014 | Karaki .......................... 375/150 |

* cited by examiner

United States Patent No. US 9,178,561 B2

METHOD AND APPARATUS FOR CORRELATING SIGNALS RECEIVED FROM A NAVIGATION SATELLITE SYSTEM

CROSS-REFERENCE TO RELATED APPLICATION

The present disclosure claims the benefit of U.S. Provisional Patent Application No. 61/876,368, entitled "Data-Shift and Combined Methods for GNSS Parallel Correlator," filed on Sep. 11, 2013, which is incorporated herein by reference in its entirety.

FIELD OF THE DISCLOSURE

The present disclosure relates generally to global navigation satellite system (GNSS) receivers and, more particularly, to correlation techniques associated with detecting pseudo random number (PRN) codes in GNSS signals.

BACKGROUND

The Global Positioning System (GPS) is a U.S. government-supported system for precise position and velocity determination of objects. Orbiting satellites emit coded radio frequency signals that are received and processed by receivers on or near the surface of the earth to obtain pseudorange measurements, approximate instantaneous distances between the satellites and receiver. Because the satellite orbits and signal transmission times are known precisely, the receipt time of a particular signal bit can be used to quantify the transit time or range to the particular satellite. The orbits of the GPS satellites are arranged in multiple planes so that signals can be received from at least four satellites at any point on or near the earth, allowing precise position and velocity measurements of the receiver. Each satellite continually transmits a spread-spectrum signal that is modulated by a pseudo-random number (PRN) code unique to the satellite. A receiver can therefore identify and separate signals from each satellite into separate channels, process the channel data separately, and combine the processed data to compute a position of the receiver. In addition to the PRN code, the signals are modulated by slower-varying data signals defining the satellite orbits and other relevant information needed for the computations. The most common PRN code is a binary sequence of 0's and 1's or −1's and +1's that modulates the carrier phase.

The PRN code is combined with a 50 Hz data stream using binary phase shift keying (BPSK), and thus the polarity of the PRN code potentially changes every 20 ms, i.e., a 180° phase shift in the PRN code can occur every 20 ms.

In the receiver, local signals corresponding to known PRN codes are generated and correlated with the received signals to detect PRN codes in the received signals. Since the time at which each bit of a known PRN code sequence is transmitted from the satellite is known, the time of receipt of each bit is a direct measure of the transmit time of the signal from the satellite to the receiver, and therefore a measure of the distance between the two. Based on the computed relative phase of the received signal, the receiver calculates the desired quantities of distance, velocity, etc.

SUMMARY

In an embodiment, a method includes storing a plurality of samples of a signal in a buffer implemented in a memory device, the signal corresponding to a navigation system; determining, with one or more integrated circuit devices, a plurality of starting locations in the buffer, the plurality of starting locations corresponding to a plurality of correlations to be calculated; calculating, with one or more integrated circuit devices, a plurality of correlations using i) a plurality of local replica signals, and ii) data read from the buffer using the plurality of starting locations, wherein the local replica signals correspond to pseudo random number (PRN) codes utilized by transmitting devices in the navigation system; and using, with one or more integrated circuit devices, the plurality of correlations to one or more of i) detect PRN codes in the signal, ii) detect one or more phase shifts associated with PRN codes, or iii) detect one or more frequency shifts associated with PRN codes.

In other embodiments, the method further includes one of or any suitable combination of two or more of the following features.

Determining the plurality of starting locations comprises determining respective starting locations for each correlation to be calculated.

Determining the plurality of starting locations comprises determining respective starting locations for respective sets of correlations to be calculated, wherein each set includes multiple correlations.

Calculating the plurality of correlations comprises calculating the plurality of correlations using a plurality of calculator devices.

Calculating the plurality of correlations comprises calculating the plurality of correlations by time sharing a single calculator device.

The method further includes reading data from the buffer using the plurality of starting locations.

The navigation system is a navigation satellite system (NSS); and the transmitting devices are included in satellites.

The NSS is a global navigation satellite system (GNSS).

In another embodiment, an apparatus comprises a memory device including a buffer for storing a plurality of samples of a signal the signal corresponding to a navigation system; and one or more integrated circuit devices configured to: determine a plurality of starting locations in the buffer, the plurality of starting locations corresponding to a plurality of correlations to be calculated, calculate a plurality of correlations using i) a plurality of local replica signals, and ii) data read from the buffer using the plurality of starting locations, wherein the local replica signals correspond to pseudo random number (PRN) codes utilized by transmitting devices in the navigation system, and use the plurality of correlations to one or more of i) detect PRN codes in the signal, ii) detect one or more phase shifts associated with PRN codes, or iii) detect one or more frequency shifts associated with PRN codes.

In other embodiments, the apparatus further includes one of or any suitable combination of two or more of the following features.

The one or more integrated circuit devices are configured to determine respective starting locations for each correlation to be calculated.

The one or more integrated circuit devices are configured to determine respective starting locations for respective sets of correlations to be calculated, wherein each set includes multiple correlations.

The one or more integrated circuit devices comprise a plurality of calculator devices.

The apparatus further comprises a multiplexer coupled to i) the memory device, and ii) the plurality of calculator devices.

The multiplexer couples the plurality of calculator devices to a read interface of the memory device.

The one or more integrated circuit devices comprise a plurality of start location calculator devices configured to calculate the plurality of starting locations.

The one or more integrated circuit devices comprise a single calculator device configured to calculate the plurality of correlations by time sharing the single calculator device.

The one or more integrated circuit devices comprise a plurality of signal generator devices configured to generate the plurality of local replica signals.

The one or more integrated circuit devices comprise a processor device configured to execute machine readable instructions.

The one or more integrated circuit devices comprise a digital front end of a navigation system receiver.

The apparatus further comprises an analog-to-digital converter (ADC) configured to generate the plurality of samples of the signal based on an analog signal, the analog signal corresponding to the navigation system.

The apparatus further comprises a radio frequency (RF) front end of the navigation system receiver, the RF front end configured to generate the analog signal.

DETAILED DESCRIPTION

Example correlation methods and apparatus are described herein in the context of the Global Positioning System (GPS). It is noted, in light of the disclosure and teachings herein, that similar methods and apparatus are suitable for use in other positioning systems as well, including global and regional positioning systems such as the Galileo system, the GLObal NAvigation Satellite System (GLONASS), and the BeiDou Navigation Satellite System (BDS). It is also noted, in light of the disclosure and teachings herein, that similar methods and apparatus are suitable to be utilized in other communication systems such as communication systems that utilize code division multiplexing (CDM) or pulse-based ultra wide bandwidth (UWB).

Figure 1:
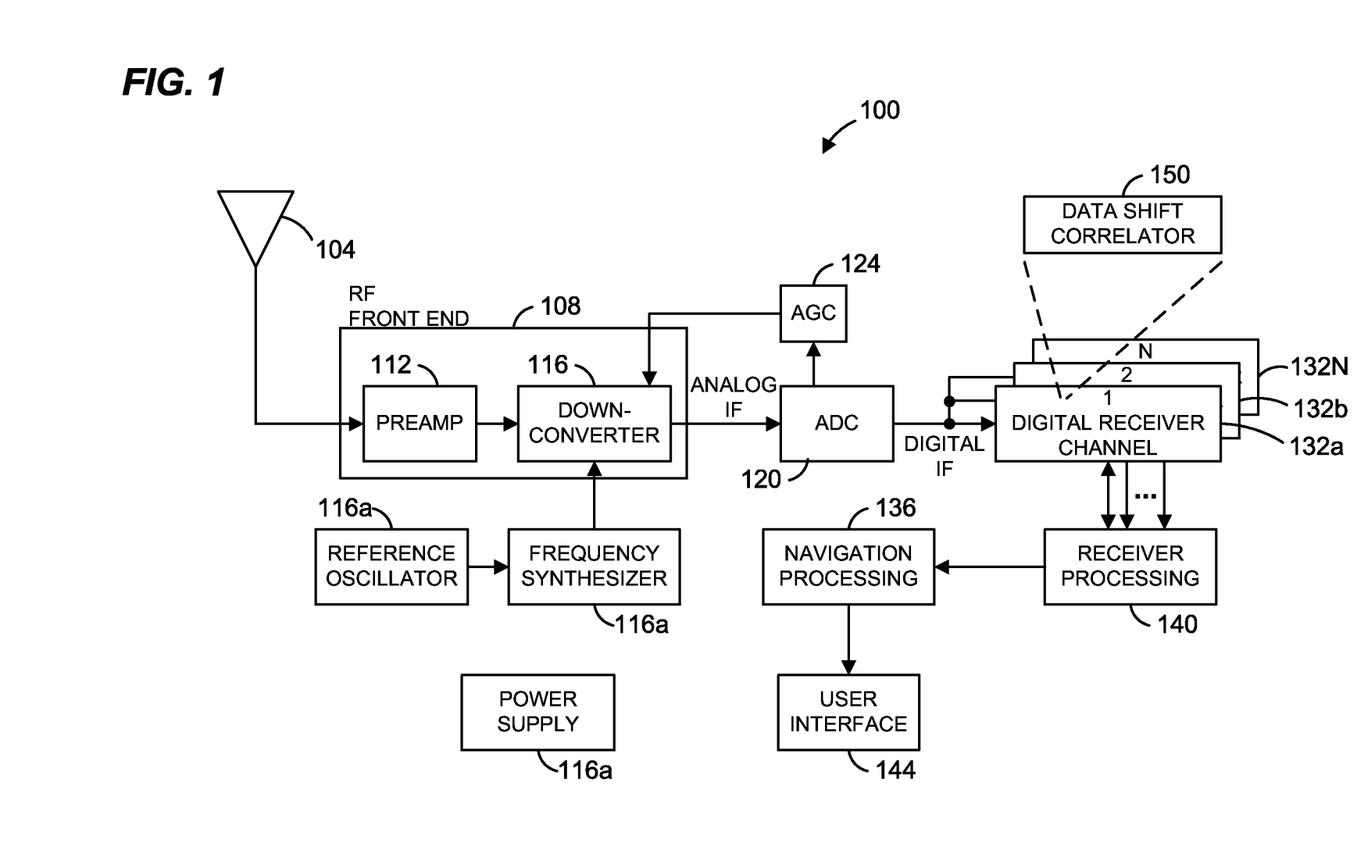
FIG. 1 is a block diagram of an example global positioning system (GPS) receiver, according to an embodiment.

FIG. 1 is a block diagram of an example GPS receiver 100, according to an embodiment. The GPS receiver 100 includes an antenna coupled to a radio frequency (RF) front end unit 108 having a preamplifier 112 coupled to a down-converter 116. The down-converter 116 down converts a received RF signal from an RF to an intermediate frequency (IF) to generate an analog IF signal. An analog-to-digital converter (ADC) 120 is coupled to the RF front end unit 108 and converts the analog IF signal to a digital IF signal. An automatic gain control (AGC) unit 124 is coupled to the ADC 120 and receives an output of the ADC 120. The AGC unit 124 controls a variable gain unit in the down-converter 116 based on the output of the AGC unit 124.

A plurality of digital receiver units 132 are coupled to the ADC 120. Each receiver unit 132 is configured to demodulate a signal modulated by a pseudo-random noise (PRN) code corresponding to a respective GPS satellite. Thus, in an embodiment, each receiver unit 132 corresponds to a respective GPS satellite. In one embodiment, the GPS receiver 100 includes at least four receiver units 132. In various different embodiments, the GPS receiver 100 includes other suitable numbers of receiver units 132 (e.g., five, six, seven, eight, nine, ten, etc., receiver units 132). The plurality of digital receiver units 132 generate a plurality of digital signals corresponding to signals from a plurality of satellites. The plurality of digital signals is provided to a receiver processing unit 140.

In an embodiment, each digital receiver unit 132 includes one or more correlators 150 for correlating a received signal with a plurality of delayed and advanced local versions of one or more PRN codes at various phase shifts and various Doppler shifts. In another embodiment, one or more correlators 150 are utilized by or in conjunction with the digital receiver units 132. In some implementations, there may be about 1000 PRN code candidates and, for each candidate, thousands of local versions of the PRN code to account for phase shifts and Doppler shifts. Thus, at least in some implementations, the GPS receiver 100 may need to generate 100,000 to one million (or more) correlations. In some embodiments, a physical correlator device 150 is time-shared to generate multiple correlations corresponding to multiple local versions of one or more PRN codes. For example, in an embodiment, the physical correlator 150 operates at a suitable high clock speed so that the physical correlator 150 can be time shared. In other embodiments, a plurality of physical correlator devices 150 are utilized to generate the plurality of correlations, each physical correlator device 150 for generating a respective correlation corresponding to one of the multiple local versions of a PRN code.

In some embodiments, the correlator(s) 150 utilize correlation techniques described in more detail below. For example, in some embodiments, multiple correlations corresponding to multiple phase shifts and/or multiple Doppler shifts are generated using a single set of signal samples stored in a buffer, where different correlations are generated using different starting locations in the buffer.

A receiver processing unit 140 is coupled to the plurality of digital receiver units 132 and receives the outputs of the plurality of correlators. The receiver processing unit 140 utilizes the outputs of the correlators to generate various parameters such as a Doppler shift (frequency offset) and code phase error. Frequency offset is caused, at least in part, by a relative velocity between the satellite and the GPS receiver 100. Code phase error is caused by a variety of factors including a change in the distance between the satellite and the GPS receiver 100.

A navigation processing unit 136 receives baseband signals corresponding to signals from a plurality of satellites and parameters generated by the receiver processing unit 140. The navigation processing unit 136 generates a position estimate and provides the position estimate to a user interface 144. In one embodiment, the navigation processing unit 136 generates a velocity estimate and provides the velocity estimate to the user interface 144. In another embodiment, the navigation processing unit 136 does not generate the velocity estimate.

Figure 2:
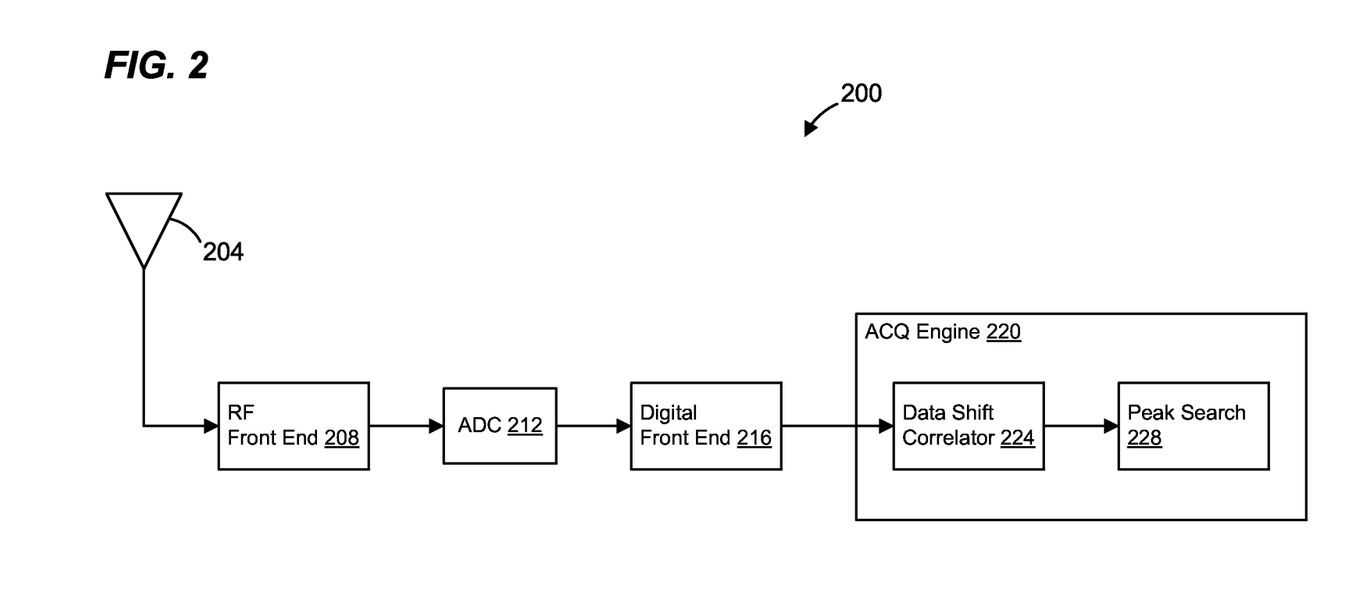
FIG. 2 is a block diagram of a portion of an example navigation system receiver, according to an embodiment.

FIG. 2 is a block diagram of an example navigation satellite system (NSS) receiver 200, according to an embodiment. In some embodiments, the NSS receiver 200 is a global navigation satellite system (GNSS) receiver. For example, in an embodiment, the NSS receiver 200 is a GPS receiver. In another embodiment, the NSS receiver 200 is a Galileo receiver. In yet another embodiment, the NSS receiver 200 is a GLONASS receiver. In yet another embodiment, the NSS receiver 200 is a BDS receiver.

In some embodiments, the NSS receiver 200 is embodied in the receiver 100 of FIG. 1. Merely for explanatory reasons, the NSS receiver 200 is discussed with reference to FIG. 1. In some embodiments, however, the NSS receiver 200 is embodied in another suitable receiver different than the GPS receiver 100 of FIG. 1.

The NSS receiver 200 includes an antenna 204 coupled to a radio frequency (RF) front end unit 208. In an embodiment, the RF front end unit 208 comprises the RF front end unit 108 of FIG. 1. In other embodiments, the RF front end unit 212 is another suitable RF front end unit different than the RF front end unit 108 of FIG. 1. In an embodiment, the RF front end unit 208 generates an IF signal.

An ADC 212 is coupled to the RF front end unit 208 and converts an analog signal generate by the RF front end unit 208 to a digital signal. In an embodiment, the output of the RF front end unit 208 is an analog IF signal and the AGC unit 212 converts the analog IF signal to a digital IF signal. In an embodiment, the digital IF signal includes an in phase (I) component and a quadrature (Q) component.

A digital front end unit 216 is coupled to the ADC 212. In an embodiment, the digital front end unit 216 performs digital filtering and other suitable digital signal processing on the digital signal generated by the ADC 212. In an embodiment in which the output of the ADC 212 includes I and Q components, the digital front end unit 216 is configured to convert the I and Q components to a baseband signal. In an embodiment, the digital front end 216 is included in and/or associated with the receiver units 132 of FIG. 1.

A signal acquisition (ACQ) engine 220 is coupled to the digital front end 216. The ACQ engine 220 is configured to correlate a received signal with a plurality of delayed and advanced local versions of one or more PRN codes at various phase shifts and various Doppler shifts. The ACQ engine 220 includes a correlator unit 224 and a peak search unit 228. The correlator unit 224 is configured to correlate the received signal with a plurality of delayed and advanced local versions of one or more PRN codes at various phase shifts and various Doppler shifts, in an embodiment. The peak search unit 228 is configured to identify peaks in correlation signals generated by the correlator unit 224. In some embodiments, peak identification is utilized for one or more of i) detection of PRN codes in a received signal, ii) satellite identification, iii) phase error identification and/or adjustment, iv) frequency offset identification and/or adjustment, etc. For example, identification of a peak corresponding to correlation with a particular local signal may indicate one or more of i) that a particular PRN code (corresponding to the particular local signal) is included in the received signal, ii) a phase of the signal with respect to the PRN code, iii) a frequency offset between the received signal and a local oscillator, etc.

In some embodiments, there may be about 1000 PRN code candidates and, for each candidate, thousands of local versions of the PRN code to account for phase shifts and Doppler shifts. Thus, at least in some embodiments, the correlator unit 224 may need to generate 100,000 to one million (or more) correlations. In some embodiments, the correlator unit 224 includes a physical correlator that is time-shared to generate multiple correlations corresponding to multiple local versions of one or more PRN codes. For example, in an embodiment, the physical correlator operates at a suitable high clock speed so that the physical correlator can be time shared. In other embodiments, the correlator unit 224 includes a plurality of physical correlators, each physical correlator for generating a respective correlation corresponding to one of the multiple local versions of a PRN code.

In an embodiment, in an embodiment, the ACQ engine 220 is included in and/or associated with the receiver units 132 of FIG. 1. For example, in an embodiment, the ACQ engine 220 is separate from the receiver units 132 of FIG. 1. In another embodiment, a respective instance of the ACQ engine 220 is included in each receiver unit 132.

In some embodiments, correlation techniques, such as correlation techniques described in more detail below, are utilized in the ACQ engine 220. For example, in some embodiments, multiple correlations corresponding to multiple phase shifts and/or multiple Doppler shifts are generated by the data shift correlator 224 using a single set of signal samples stored in a buffer, where the data shift correlator 224 generates different correlations using different starting locations in the buffer.

Figure 3:
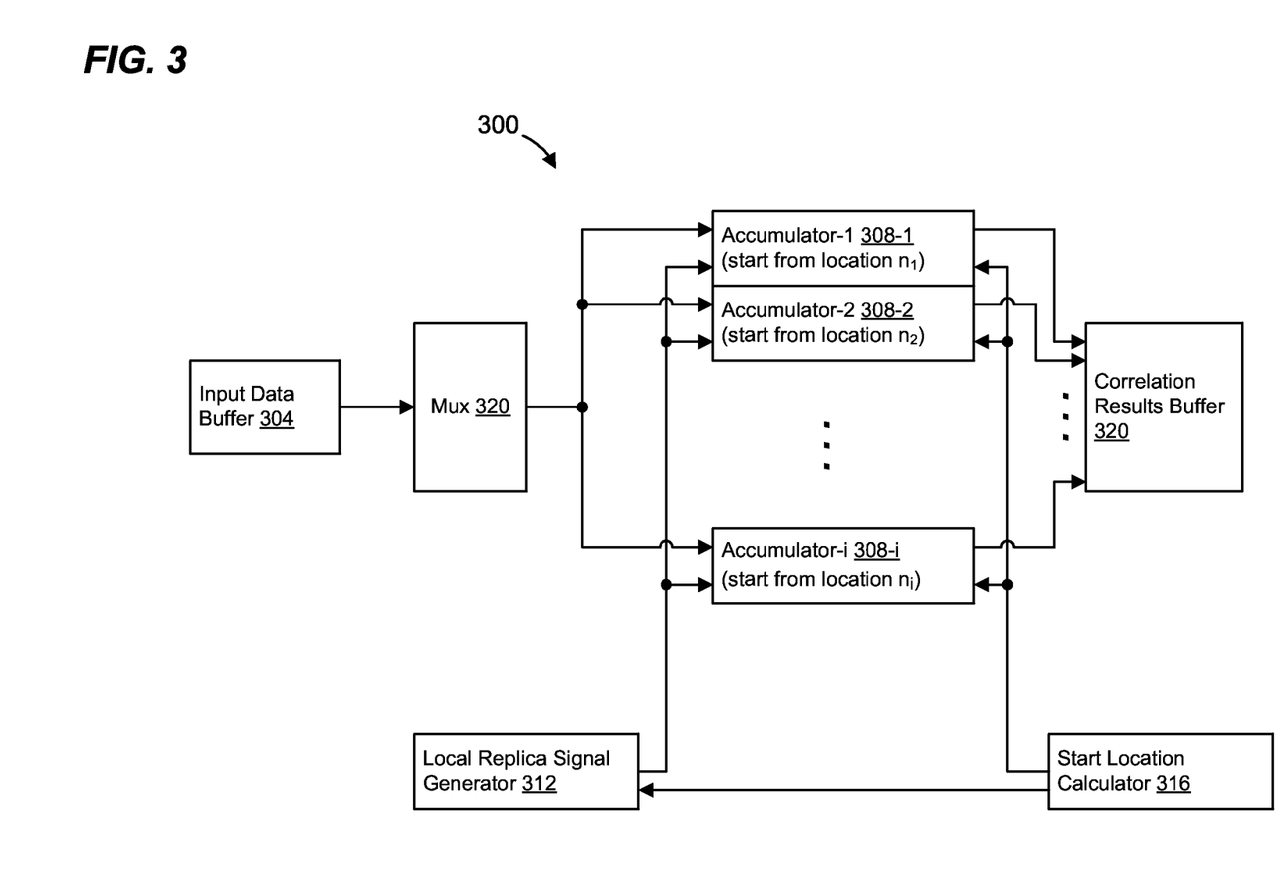
FIG. 3 is a block diagram of an example correlator, according to an embodiment.

FIG. 3 is a block diagram of an example correlator 300, according to an embodiment. In some embodiments, the correlator 300 is utilized as the correlator 208 of FIG. 2. In some embodiments, the correlator 300 is utilized as the correlator 150 of FIG. 1. In other embodiments, the correlator 300 is utilized with other suitable NSS receivers.

The correlator 300 is generally configured to correlate samples of a signal stored in a data buffer 304 with a plurality of local replica signals corresponding to multiple versions of one or more PRN codes including, for each of the one or more PRN codes, a set of local signals corresponding to multiple phase shifts and multiple Doppler shifts. The one or more PRN codes correspond to one or more satellites, in an embodiment. The signal corresponding to the samples stored in the buffer 304 is a signal received by a NSS receiver, in an embodiment. For example, in an embodiment, the received signal corresponds to signals transmitted by one or more NSS satellites.

Additionally, as will be described in more detail below, the correlator 300 is configured to start reading data from the buffer 304 at different starting locations in the buffer 304 for different replica signals. Thus, the correlator 300 performs correlations between the plurality of replica signals and shifted sets of data retrieved from the buffer 304. This is beneficial, at least in some embodiments, when polarity of the satellite signal may change at certain intervals (e.g., every 10 ms in an illustrative embodiment). For example, if a correlation is performed with a set of satellite signal data in which polarity changes at a midpoint within the set such that a first set of the satellite signal data has a positive polarity and a second set of the satellite signal data has a negative polarity, a correlation result will tend to be significantly reduced in comparison with a correlation result if the same signal data did not include the polarity switch. In particular, because of the polarity switch, a first correlation sub-result corresponding to the first set of the satellite signal data will tend to cancel out a second correlation sub-result corresponding to the second set of the satellite signal data. Thus, the correlator 300 utilizes the different starting locations in the buffer 304 to mitigate the effects of possible polarity changes.

In an embodiment, the buffer 304 is implemented in a suitable memory device.

The correlator 300 includes a plurality of accumulator calculators 308 (e.g., M accumulator calculators 308, where M is a suitable positive integer greater than one). Each accumulator calculator 308 is for performing correlation calculations to generate correlation results corresponding to a correlation between a respective local replica signal and a respective set of data in the input buffer 304. In some embodiments, each accumulator calculator 308 is implemented as a separate physical calculator. In other embodiments, however, each accumulator calculator 308 is a logical calculator and multiple accumulator calculators 308 are implemented a single physical device that is time shared. For example, in some embodiments, M logical accumulator calculators 308 are implemented using less than M physical devices, e.g., only one physical device, M/2 physical devices, M/4 physical devices, M/8 physical devices, etc.

Each accumulator calculator 308 receives a respective local replica signal from a signal generator 312. In an embodiment, a single signal generator 312 generates M local replica signals for the M accumulator calculators 308. In an embodiment, multiple signal generators 312 generate the M local replica signals for the M accumulator calculators 308. In an embodiment, each accumulator calculator 308 includes a respective signal generator 312 for generating the respective local replica signal.

Each accumulator calculator 308 also receives a respective indicator of a starting location in the buffer 304 corresponding to a respective data set in the buffer 304 with which the accumulator calculator 308 is to calculate a respective correlation. For example, in an embodiment, an i-th accumulator calculator 308 receives an indicator of a starting location $n_i$ in the buffer 304. In an embodiment, a starting location generator 316 generates M indications of M starting locations for the M accumulator calculators 308. In an embodiment, multiple starting location generators 316 generate the M starting locations for the M accumulator calculators 308. In an embodiment, each accumulator calculator 308 includes a respective starting location generator 316 for generating the respective indication of the respective starting location. In an embodiment, a different starting location is utilized for each accumulator calculator 308. In some embodiments and/or in some scenarios, a same starting location is utilized for a subset (i.e., for less than M) of the accumulator calculators 308.

The start location calculator 316 may utilize a suitable technique for determining a starting location $n_i$ in the buffer 304 for the i-th accumulator calculator 308. In an embodiment, the starting locations generated by the start location calculator 316 are determined such that each calculated correlation uses a set of data in the buffer 304 in which a polarity change will not occur. In some embodiments, the start location calculator 316 determines the starting location $n_i$ based on an i-th code phase with which the i-th accumulator calculator 308 is to calculate a correlation. In an illustrative embodiment, the starting location $n_i$ is calculated according to:

$$n_i = N - p_i \quad \text{Equation 1}$$

where N is a bit period (e.g., the period corresponding to when potential polarity changes in the received signal can occur) in units of samples and $p_i$ is the i-th possible candidate of the initial phase of first sample in 304, in units of samples, that corresponds to the i-th code phase. For example, if the initial phase of first sample in 304 is in a range $p_o$ to $p_o+p_r$, and the searching resolution is $p_s$, then $p_i$ will be $p_o+ip_s$ with (i=0 to $p_r/p_s$). If the starting address $n_i$ is not zero, the code phase of the local replica generated by the signal generator 312 is adjusted accordingly.

Each accumulator calculator 308 uses the corresponding starting location generated by the start location calculator 316 to read data from the buffer 304 starting at the indicated location, and calculates a correlation with the corresponding local replica signal generated by the signal generator 312. In an embodiment, each calculated correlation uses a set of data in the buffer 304 in which a polarity change will not occur.

In an embodiment, a multiplexer 320 couples the accumulator calculators 308 to the buffer 304 to permit the accumulator calculators 308 to read data from the buffer 304. In an embodiment, the multiplexer 320 multiplexes access to a number R of read interface(s) of the buffer 304, where R is much less than N. In some embodiments, R=1. In some embodiments, the multiplexer 320 is omitted. For example, in embodiments in which the accumulator calculators 308 are implemented by a small number (e.g., one or two) of physical devices that are time shared and the buffer 304 includes a read interface for each physical device, the multiplexer 320 may be omitted.

Correlations calculated by the accumulator calculators 308 are stored in a correlations results buffer 320. Correlations stored in the correlations results buffer 320 are utilized, by another module or device (e.g., the peak search module 228 (FIG. 2) or another suitable module or device). For example, correlations stored in the buffer 320 are utilized to detect PRN codes in the received signal, in an embodiment. In other embodiments, correlations stored in the buffer 320 are utilized for one or more of i) detecting a PRN code, ii) detecting a phase shift in the received signal with respect to a local replica signal, iii) detecting a frequency shift (e.g., a Doppler frequency shift) in the received signal, etc.

Figure 4:
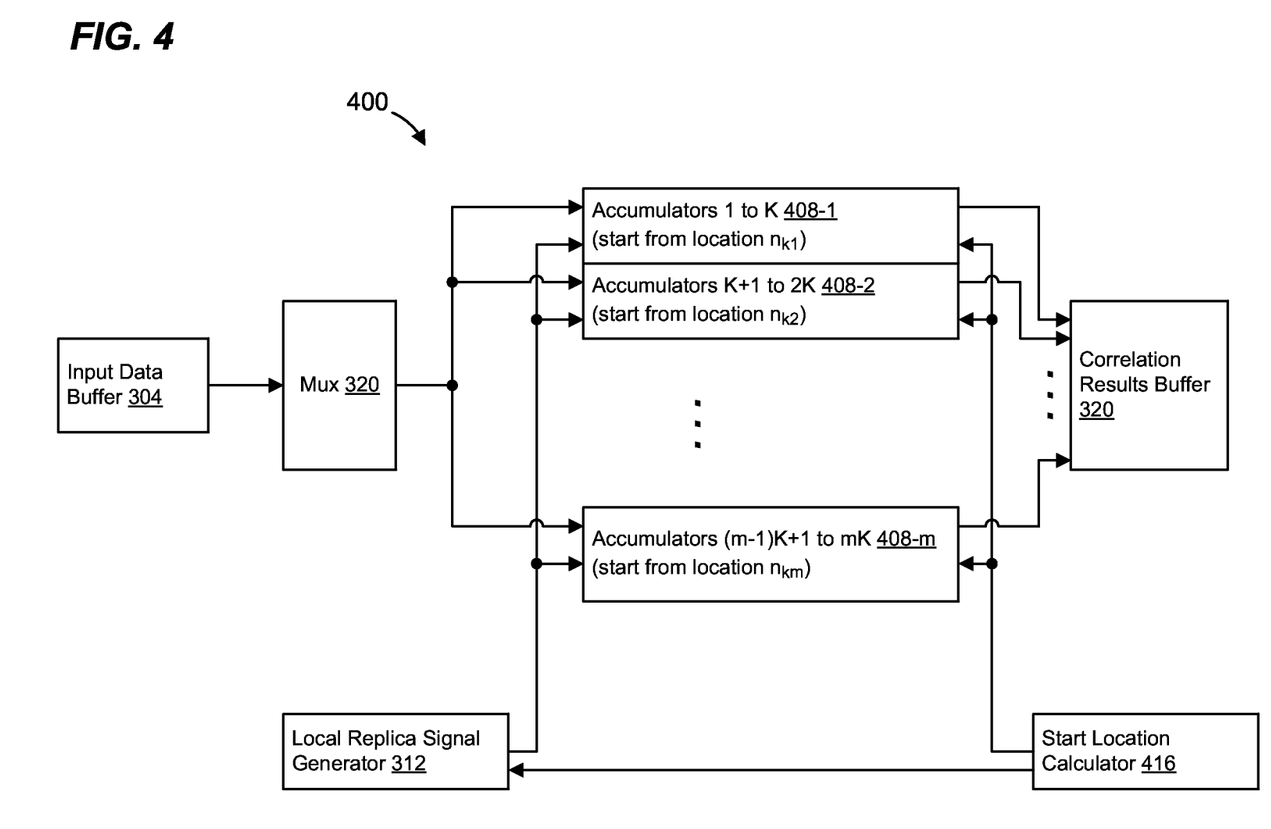
FIG. 4 is a block diagram of another example correlator, according to another embodiment.

FIG. 4 is a block diagram of another example correlator 400, according to another embodiment. In some embodiments, the correlator 400 is utilized as the correlator 208 of FIG. 2. In some embodiments, the correlator 400 is utilized as the correlator 150 of FIG. 1. In other embodiments, the correlator 400 is utilized with other suitable NSS receivers.

Some of the blocks in FIG. 4 are the same as like-numbered blocks in FIG. 3 and thus are not discussed in detail.

Similar to the correlator 300, the correlator 400 is generally configured to correlate a signal stored in a data buffer 304 with a plurality of local replica signals corresponding to multiple versions of one or more PRN codes including, for each of the one or more PRN codes, a set of local signals corresponding to multiple phase shifts and multiple Doppler shifts. The one or more PRN codes correspond to one or more satellites, in an embodiment.

Also similar to the correlator 300 and as will be described in more detail below, the correlator 400 is configured to start reading data from the buffer 304 at different starting locations in the buffer 304 for different replica signals. Thus, the correlator 400 performs correlations between the plurality of replica signals and shifted sets of data retrieved from the buffer 304. Similar to the correlator 300, the correlator 400 utilizes the different starting locations in the buffer 304 to mitigate the effects of possible polarity changes.

The correlator 400 includes a plurality of accumulator calculators organized in M blocks 408 (e.g., MK accumulator calculators, where K is a suitable positive integer greater than one), where M is a suitable positive integer greater than one. Each accumulator calculator in each block 408 is similar to the accumulator calculators 308 of FIG. 3. For example, in some embodiments, each accumulator calculator is implemented as a separate physical calculator, whereas in other embodiments, each accumulator calculator is a logical calculator and multiple accumulator calculators are implemented a single physical device that is time shared.

As with the correlator 300, each accumulator calculator receives a respective local replica signal from a signal generator 312.

Each block of accumulator calculators 408 also receives a respective indicator of a starting location in the buffer 304 corresponding to a respective data set in the buffer 304 with which all accumulator calculators in the block 408 are to calculate respective correlations. For example, in an embodiment, an m-th block 408 receives an indicator of a starting location $n_{km}$ in the buffer 304. In an embodiment, a starting location generator 416 generates m indications of m starting locations for the m accumulator calculator blocks 408. In an embodiment, multiple starting location generators 416 generate the m starting locations for the m accumulator calculator blocks 408. In an embodiment, each accumulator calculator block 408 includes a respective starting location generator 416 for generating the respective indication of the respective starting location for accumulator calculators in the block 408.

The start location calculator 416 may utilize a suitable technique for determining a starting location $n_{k_m}$ in the buffer 304 for the $k_m$-th block 408 of accumulator calculators. For example, in an embodiment, the start location calculator 416 generates a plurality of individual starting locations for all of the accumulator calculators in the block 408 according to Equation 1, and then determines the starting location for the block 408 as an average of the individual starting locations. In another embodiment, the start location calculator 416 generates a highest starting location for all of the accumulator calculators in the block 408 according to Equation 1, similarly generates a lowest starting location, and then determines the starting location for the block 408 as an average of the highest location and the lowest location, a midpoint between the highest location and the lowest location, etc.

Each accumulator calculator in a block 408 uses the corresponding starting location generated by the start location calculator 416 to read data from the buffer 304 starting at the indicated location, and calculates a correlation with the corresponding local replica signal generated by the signal generator 312.

Figure 5:
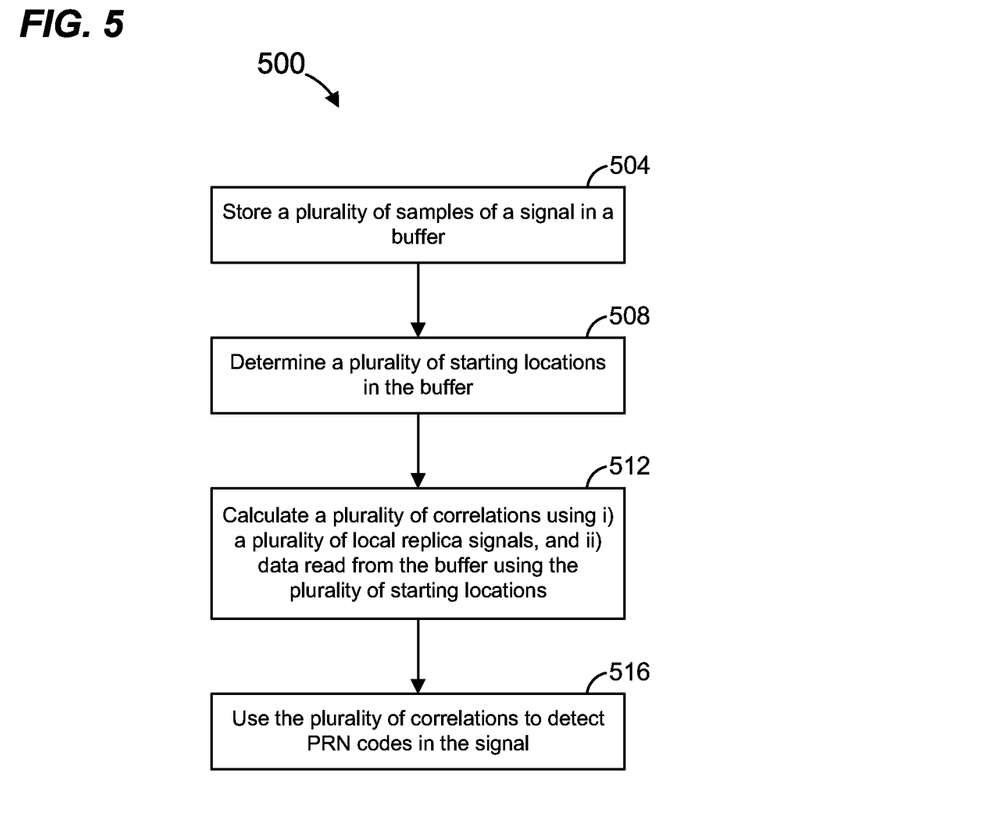
FIG. 5 is a flow diagram of an example method for generating a plurality of correlations, according to an embodiment.

FIG. 5 is a flow diagram of an example method 500 for generating a plurality of correlations, according to an embodiment. The method 500 is implemented by the correlator 300 of FIG. 3, in an embodiment. The method 500 is implemented by the correlator 400 of FIG. 4, in another embodiment. The method 500 will be described with reference to FIGS. 3 and 4 merely for explanatory purposes. In other embodiments, however, the method 500 is implemented by another suitable apparatus.

At block 504, a plurality of samples of a signal are stored in a buffer. For example, samples of a signal received by an NSS receiver are stored in the input data buffer 304, where the received signal corresponds to transmitted signals from one or more satellites, according to some embodiments.

At block 508, a plurality of starting locations in the buffer are determined. The plurality of starting locations correspond to a plurality of correlations to be calculated. For example, the start location calculator 316 determines the plurality of starting locations, in an embodiment. As another example, the start location calculator 416 determines the plurality of starting locations, in an embodiment.

At block 512, a plurality of correlations are calculated using i) a plurality of local replica signals, and ii) data read from the buffer using the plurality of starting locations. In an embodiment, the local replica signals correspond to PRN codes utilized by satellites in an NSS. In some embodiments, the local replica signals correspond to PRN codes at different phase shifts. In some embodiments, the local replica signals correspond to PRN codes at different frequency shifts (e.g., different Doppler frequency shifts). In an embodiment, the plurality of correlators 308 (FIG. 3) calculate the plurality of correlations using the start locations generated by the start location calculator 316. In another embodiment, the plurality of blocks 408 of correlation calculators 408 (FIG. 4) calculate the plurality of correlations using the start locations generated by the start location calculator 416.

At block 516, the plurality of correlations calculated at block 512 are utilized to detect PRN codes in the signal. For example, in an embodiment, the plurality of correlations are stored in the buffer 320 and utilized by the peak search module 228 (FIG. 2) to identify peaks in the correlations. Such peaks are utilized to determine one or more of i) whether one or more PRN codes are detectable in the signal, ii) a phase shift in the received signal with respect to a local replica signal, iii) a frequency shift (e.g., a Doppler frequency shift) in the received signal, etc. In an embodiment, the correlations at block 512 are utilized by the peak search module 228 or another suitable module or device.

Referring now to FIGS. 1-5, in some embodiments, the correlator 208 of FIG. 2 and the correlator 150 of FIG. 1 utilize a suitable correlator other than the correlator 300 (FIG. 3) or the correlator 400 (FIG. 4), such suitable correlator utilizing techniques described with reference to FIG. 5.

Additionally, the apparatus of FIGS. 2-4 may be modified to be utilized with other communication systems such as communication systems that utilize CDM or pulse-based UWB. For example, the NSS receiver 200 may be modified to process CDM signals or pulse-based UWB signals, in some embodiments. Similarly, the correlator 300 and/or the correlator 400 may be modified to process CDM signals or pulse-based UWB signals, in some embodiments. For example, the local replica signal generator 312 may be modified to generate local replica signals corresponding to CDM signals or pulse-based UWB signals, in some embodiments. Similarly, the method 500 may be modified for use with other communication systems such as communication systems that utilize CDM or pulse-based UWB. For example, block 504 may be modified to store samples of a signal corresponding to a CDM signal or a pulse-based UWB signal, in some embodiments. Also, block 512 may be modified to utilize local replica signals corresponding to CDM signals or pulse-based UWB signals, in some embodiments.

In an embodiment, a method includes storing a plurality of samples of a signal in a buffer implemented in a memory device, the signal corresponding to a navigation system; determining, with one or more integrated circuit devices, a plurality of starting locations in the buffer, the plurality of starting locations corresponding to a plurality of correlations to be calculated; calculating, with one or more integrated circuit devices, a plurality of correlations using i) a plurality of local replica signals, and ii) data read from the buffer using the plurality of starting locations, wherein the local replica signals correspond to pseudo random number (PRN) codes utilized by transmitting devices in the navigation system; and using, with one or more integrated circuit devices, the plurality of correlations to one or more of i) detect PRN codes in the signal, ii) detect one or more phase shifts associated with PRN codes, or iii) detect one or more frequency shifts associated with PRN codes.

In other embodiments, the method further includes one of or any suitable combination of two or more of the following features.

Determining the plurality of starting locations comprises determining respective starting locations for each correlation to be calculated.

Determining the plurality of starting locations comprises determining respective starting locations for respective sets of correlations to be calculated, wherein each set includes multiple correlations.

Calculating the plurality of correlations comprises calculating the plurality of correlations using a plurality of calculator devices.

Calculating the plurality of correlations comprises calculating the plurality of correlations by time sharing a single calculator device.

The method further includes reading data from the buffer using the plurality of starting locations.

The navigation system is a navigation satellite system (NSS); and the transmitting devices are included in satellites.

The NSS is a global navigation satellite system (GNSS).

In another embodiment, an apparatus comprises a memory device including a buffer for storing a plurality of samples of a signal the signal corresponding to a navigation system; and one or more integrated circuit devices configured to: determine a plurality of starting locations in the buffer, the plurality of starting locations corresponding to a plurality of correlations to be calculated, calculate a plurality of correlations using i) a plurality of local replica signals, and ii) data read from the buffer using the plurality of starting locations, wherein the local replica signals correspond to pseudo random number (PRN) codes utilized by transmitting devices in the navigation system, and use the plurality of correlations to one or more of i) detect PRN codes in the signal, ii) detect one or more phase shifts associated with PRN codes, or iii) detect one or more frequency shifts associated with PRN codes.

In other embodiments, the apparatus further includes one of or any suitable combination of two or more of the following features.

The one or more integrated circuit devices are configured to determine respective starting locations for each correlation to be calculated.

The one or more integrated circuit devices are configured to determine respective starting locations for respective sets of correlations to be calculated, wherein each set includes multiple correlations.

The one or more integrated circuit devices comprise a plurality of calculator devices.

The apparatus further comprises a multiplexer coupled to i) the memory device, and ii) the plurality of calculator devices.

The multiplexer couples the plurality of calculator devices to a read interface of the memory device.

The one or more integrated circuit devices comprise a plurality of start location calculator devices configured to calculate the plurality of starting locations.

The one or more integrated circuit devices comprise a single calculator device configured to calculate the plurality of correlations by time sharing the single calculator device.

The one or more integrated circuit devices comprise a plurality of signal generator devices configured to generate the plurality of local replica signals.

The one or more integrated circuit devices comprise a processor device configured to execute machine readable instructions.

The one or more integrated circuit devices comprise a digital front end of a navigation system receiver.

The apparatus further comprises an analog-to-digital converter (ADC) configured to generate the plurality of samples of the signal based on an analog signal, the analog signal corresponding to the navigation system.

The apparatus further comprises a radio frequency (RF) front end of the navigation system receiver, the RF front end configured to generate the analog signal.

At least some of the various blocks, operations, and techniques described above may be implemented utilizing hardware, a processor executing firmware instructions, a processor executing software instructions, or any combination thereof. When implemented utilizing one or more processors executing software or firmware instructions, the software or firmware instructions may be stored in any suitable non-transitory computer readable medium such as a magnetic disk, an optical disk, a magnetic tape, a random access memory (RAM), a read only memory (ROM), a flash memory, etc. The software or firmware instructions may include machine readable instructions that, when executed by one or more processors, cause the one or more processors to perform various acts. Such software or firmware instructions may be stored in a memory device (e.g., an instruction memory) coupled to the one or more processors.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method, comprising:
   storing a plurality of samples of a signal in a buffer implemented in a memory device, the signal corresponding to a navigation system;
   determining, with one or more integrated circuit devices, a plurality of starting locations in the buffer, the plurality of starting locations corresponding to a plurality of correlations to be calculated, wherein ones of at least some of the starting locations are determined based on respective code phases with which the corresponding correlations are to be performed;
   calculating, with one or more integrated circuit devices, a plurality of correlations using i) a plurality of local replica signals, and ii) data read from the buffer using the plurality of starting locations, wherein the local replica signals correspond to pseudo random number (PRN) codes utilized by transmitting devices in the navigation system; and
   using, with one or more integrated circuit devices, the plurality of correlations to one or more of i) detect PRN codes in the signal, ii) detect one or more phase shifts associated with PRN codes, or iii) detect one or more frequency shifts associated with PRN codes.

2. The method of claim 1, wherein determining the plurality of starting locations comprises determining respective starting locations for each correlation to be calculated.

3. The method of claim 1, wherein determining the plurality of starting locations comprises determining respective starting locations for respective sets of correlations to be calculated, wherein each set includes multiple correlations.

4. The method of claim 1, wherein calculating the plurality of correlations comprises calculating the plurality of correlations using a plurality of calculator devices.

5. The method of claim 1, wherein calculating the plurality of correlations comprises calculating the plurality of correlations by time sharing a single calculator device.

6. The method of claim 1, further comprising reading data from the buffer using the plurality of starting locations.

7. The method of claim 1, wherein:
   the navigation system is a navigation satellite system (NSS); and
   the transmitting devices are included in satellites.

8. The method of claim 7, wherein the NSS is a global navigation satellite system (GNSS).

9. An apparatus, comprising:
   a memory device including a buffer for storing a plurality of samples of a signal the signal corresponding to a navigation system;

one or more integrated circuit devices configured to:
  determine a plurality of starting locations in the buffer, the plurality of starting locations corresponding to a plurality of correlations to be calculated, wherein ones of at least some of the starting locations are determined based on respective code phases with which the corresponding correlations are to be performed,
  calculate a plurality of correlations using i) a plurality of local replica signals, and ii) data read from the buffer using the plurality of starting locations, wherein the local replica signals correspond to pseudo random number (PRN) codes utilized by transmitting devices in the navigation system, and
  use the plurality of correlations to one or more of i) detect PRN codes in the signal, ii) detect one or more phase shifts associated with PRN codes, or iii) detect one or more frequency shifts associated with PRN codes.

10. The apparatus of claim 9, wherein the one or more integrated circuit devices are configured to determine respective starting locations for each correlation to be calculated.

11. The apparatus of claim 9, wherein the one or more integrated circuit devices are configured to determine respective starting locations for respective sets of correlations to be calculated, wherein each set includes multiple correlations.

12. The apparatus of claim 9, wherein the one or more integrated circuit devices comprise a plurality of calculator devices.

13. The apparatus of claim 12, further comprising a multiplexer coupled to i) the memory device, and ii) the plurality of calculator devices.

14. The apparatus of claim 13, wherein the multiplexer couples the plurality of calculator devices to a read interface of the memory device.

15. The apparatus of claim 12, wherein the one or more integrated circuit devices comprise a plurality of start location calculator devices configured to calculate the plurality of starting locations.

16. The apparatus of claim 9, wherein the one or more integrated circuit devices comprise a single calculator device configured to calculate the plurality of correlations by time sharing the single calculator device.

17. The apparatus of claim 9, wherein the one or more integrated circuit devices comprise a plurality of signal generator devices configured to generate the plurality of local replica signals.

18. The apparatus of claim 9, wherein the one or more integrated circuit devices comprise a processor device configured to execute machine readable instructions.

19. The apparatus of claim 9, wherein the one or more integrated circuit devices comprise a digital front end of a navigation system receiver.

20. The apparatus of claim 19, further comprising an analog-to-digital converter (ADC) configured to generate the plurality of samples of the signal based on an analog signal, the analog signal corresponding to the navigation system.

21. The apparatus of claim 20, further comprising a radio frequency (RF) front end of the navigation system receiver, the RF front end configured to generate the analog signal.

* * * * *